United States Patent
McMillen et al.

(10) Patent No.: US 7,328,950 B2
(45) Date of Patent: Feb. 12, 2008

(54) DUAL HINGE BELT LUMBAR

(75) Inventors: Robert J. McMillen, Tecumseh (CA); Larry D. Janzen, Harrow (CA)

(73) Assignee: Schukra of North America, Ltd., Lakeshore-Tecumseh, Ontario (CA)

( * ) Notice: Subject to any disclaimer, the term of this patent is extended or adjusted under 35 U.S.C. 154(b) by 33 days.

(21) Appl. No.: 11/436,276

(22) Filed: May 18, 2006

(65) Prior Publication Data

US 2006/0261653 A1   Nov. 23, 2006

Related U.S. Application Data

(60) Provisional application No. 60/682,228, filed on May 18, 2005.

(51) Int. Cl.
A47C 7/46 (2006.01)

(52) U.S. Cl. ............... 297/284.4; 297/284.8; 297/294.9

(58) Field of Classification Search ............ 297/284.4, 297/284.8, 284.9
See application file for complete search history.

(56) References Cited

U.S. PATENT DOCUMENTS

| | | | |
|---|---|---|---|
| 2,835,312 A | 5/1958 | Neely | |
| 3,378,299 A | 4/1968 | Sandor | |
| 5,022,709 A | 6/1991 | Marchino | |
| 5,088,790 A | 2/1992 | Wainwright et al. | |
| 5,518,294 A | 5/1996 | Ligon, Sr. et al. | |
| 5,641,205 A * | 6/1997 | Schmidt | 297/284.4 X |
| 5,954,399 A | 9/1999 | Hong | |
| 6,003,941 A | 12/1999 | Schuster, Sr. et al. | |
| 6,056,360 A * | 5/2000 | Schneider | 297/284.4 |
| 6,254,186 B1 | 7/2001 | Falzon | |
| 6,338,530 B1 * | 1/2002 | Gowing | 297/284.4 |
| 6,402,246 B1 | 6/2002 | Mundell | |
| 6,676,214 B2 * | 1/2004 | McMillen et al. | 297/284.4 X |
| 6,682,144 B2 | 1/2004 | Klingler | |
| 6,688,443 B2 * | 2/2004 | Liu | 297/284.4 X |
| 6,692,074 B1 * | 2/2004 | Kopetzky et al. | 297/284.8 |
| 6,893,089 B2 * | 5/2005 | McMillen et al. | 297/284.4 |
| 6,905,170 B2 * | 6/2005 | McMillen et al. | 297/284.4 |
| 6,908,152 B2 | 6/2005 | McMillen | |
| 6,908,153 B2 * | 6/2005 | Blendea | 297/284.4 |

(Continued)

FOREIGN PATENT DOCUMENTS

EP   0420824   4/1991

(Continued)

OTHER PUBLICATIONS

U.S. Appl. No. 11/295425, filed Dec. 05, 2005.

*Primary Examiner*—Rodney B. White
(74) *Attorney, Agent, or Firm*—Grant D. Kang

(57) ABSTRACT

A belt lumbar for a vehicle seat has a pair of brackets that are respectively located at opposite ends of the belt, a platform that extends between the brackets, and hinges that connect the platform to the brackets. A bowden cable extends between and pulls the brackets toward each other from a first position to a second position. The hinges are living hinges which have more flexibility than the pair of brackets and the platform. In response to the brackets moving toward each other, the hinges rotate relative to the platform and the brackets and extend the platform away from the brackets. Springs connect the ends of the belt to the sides of the seat frame.

20 Claims, 4 Drawing Sheets

U.S. PATENT DOCUMENTS

| | | | |
|---|---|---|---|
| 6,945,600 B2 * | 9/2005 | Liu | 297/284.4 |
| 7,137,664 B2 * | 11/2006 | McMillen et al. | 297/284.4 |
| 7,140,680 B2 * | 11/2006 | McMillen et al. | 297/284.9 |
| 7,140,681 B2 * | 11/2006 | McMillen | 297/284.9 |
| 2003/0062749 A1 * | 4/2003 | Liu et al. | 297/284.4 |
| 2004/0108760 A1 * | 6/2004 | McMillen | 297/284.4 |
| 2006/0163924 A1 * | 7/2006 | Liu | 297/284.4 |
| 2006/0261653 A1 * | 11/2006 | McMillen et al. | 297/284.4 |

FOREIGN PATENT DOCUMENTS

| | | |
|---|---|---|
| EP | 0296938 B1 | 6/1991 |
| EP | 0518830 | 12/1992 |
| EP | 0540481 | 5/1993 |
| GB | 2335844 | 10/1999 |

* cited by examiner

DUAL HINGE BELT LUMBAR

CROSS-REFERENCE TO RELATED APPLICATIONS

This application claims priority to U.S. App. No. 60/682,228, filed on May 18, 2005 which is herein incorporated by reference.

BACKGROUND OF THE INVENTION

1. Field of the Invention

The present invention relates to lumbar supports for seats, particularly belt lumbar devices.

2. Related Art

There are a number of different lumbar support mechanisms that are already known for seating systems. Some mechanisms increase support in the lumbar region by bowing the structure to increase its curvature such as described and illustrated in U.S. Pat. No. 6,003,941 and U.S. Pat. No. 5,518,294, while other mechanisms move or rotate the support structure forward into the lumbar region such as described and illustrated in U.S. Pat. No. 6,908,152 and US 2004/0108760, and yet other mechanisms function by pulling the support structure taut between the sides of the seat such as described and illustrated in U.S. Ser. No. 11/295,425 and generally referred to as a strap or a belt.

Even though there are many mechanisms that have provided sufficient support, there continues to be a need for strong, economical, compact components in the design of seat structures along with mechanisms that improve seat assembly procedures, such as increasing the economy, speed and efficiency of component assembly.

SUMMARY OF THE INVENTION

The present invention is a belt lumbar device that incorporates aspects of a arching lumbar and a paddle lumbar. The belt lumbar includes a pair of brackets respectively located at opposite ends of the belt, a platform extending between the brackets, and a pair of hinges connecting the platform to the brackets. A bowden cable, or other traction device, extends between and pulls the brackets toward each other. In response, the hinges rotate relative to the platform and the brackets, thereby extending the platform away from the brackets. The hinges have more flexibility than the pair of brackets and the platform. Accordingly, when the bowden cable pulls the brackets toward each other, the platform maintains the distance between the hinges so that as the hinges rotate, they push the platform out away from the brackets. Preferably, the brackets are connected to opposite sides of the seat frame through a pair of springs. In one embodiment, the bowden cable's outer sheath and the wire core are directly connected to opposite brackets. In another embodiment, a pulley is connected to one of the brackets and the wire core wraps around the pulley.

Further areas of applicability of the present invention will become apparent from the detailed description provided hereinafter. It should be understood that the detailed description and specific examples, while indicating particular embodiments of the invention, are intended for purposes of illustration only and are not intended to limit the scope of the invention.

DETAILED DESCRIPTION OF THE PREFERRED EMBODIMENTS

Figure 1:
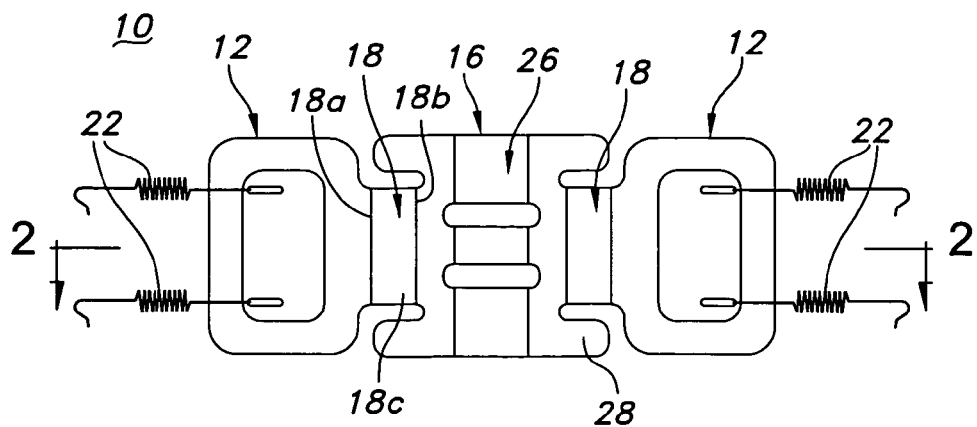
FIG. 1 is a plan view of one embodiment of the present invention.
Figure 2:
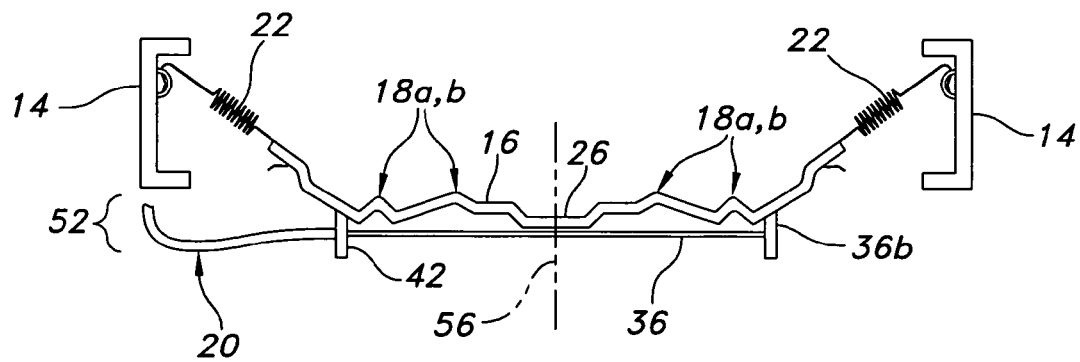
FIG. 2 is a cross-sectional view of the embodiment illustrated in FIG. 1 when it is in a retracted position.
Figure 3:
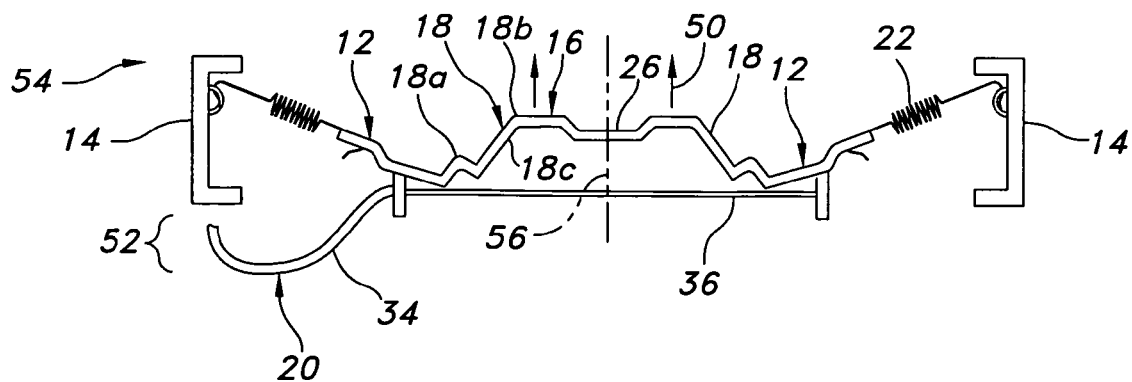
FIG. 3 is a cross-sectional view of the embodiment illustrated in FIG. 1 when it is in an extended position.

As generally illustrated in FIGS. 1-3, the belt lumbar 10 has a pair of brackets that are respectively located at opposite ends of the belt lumbar 10 and that connect to the seat frame 14. A platform 16 extends between the brackets 12, and a pair of hinged sections 18 respectively connects the brackets 12 to the platform 16. A traction element, preferably a bowden cable 20, moves the brackets 12 toward each other from a position proximate to the seat frame 14 in towards a position closer to the center of the seat frame 14. Generally, the hinged sections 18 have more flexibility than the pair of brackets 12 and the platform 16. Therefore, in response to the brackets 12 moving toward each other, the hinged sections 18 rotate relative to the platform 16 and the brackets 12 resulting in the extension of the platform 16 away from the brackets 12. Preferably, each one of the hinged sections 18 includes a bracket hinge 18a, a platform hinge 18b and an extension element 18c between the bracket hinge 18a and the platform hinge 18b.

The brackets 12 are preferably connected to opposite sides of the seat frame 14 through a respective pair of springs 22. Alternative connections could also be used which provide a degree of freedom which at least permits the brackets 12 to move relative to each other. Accordingly, any connection between the brackets 12 and the seat frame 14 should permit the brackets 12 to move such that the bowden cable 20 extends between and pulls the brackets 12 toward each other. As the brackets 12 move toward each other, the bracket hinge 18a also move toward each other. However, the distance between the platform hinge 18b remains unchanged because, as discussed above, the platform 16 is more rigid than the hinged sections 18 and therefore maintains the distance therebetween. As the hinged sections 18 rotate, they push the platform 16 out away from the brackets 12. The extension element 18c that is between both the bracket hinge 18a and the platform hinge 18b permit the platform 16 to be moved to its extended position 50 from its retracted position 52 in a uniform manner, i.e. without bowing the center portion of the support or rotating the support into the seat back by using in a different way and with different cooperative relationships some of the mechanical elements that are in arching lumbar support devices and paddle lumbar support devices.

Figure 5:
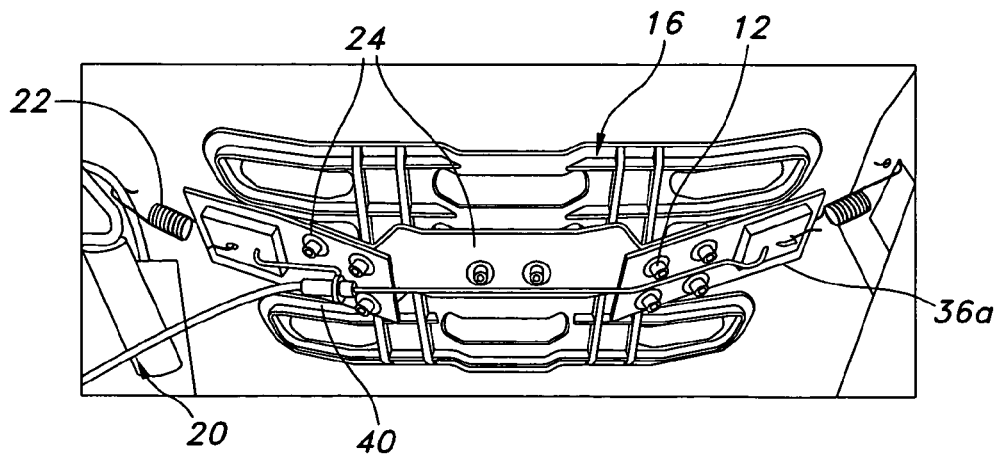
FIG. 5 is an isometric view of the present invention as installed in a seat frame.
Figure 7:
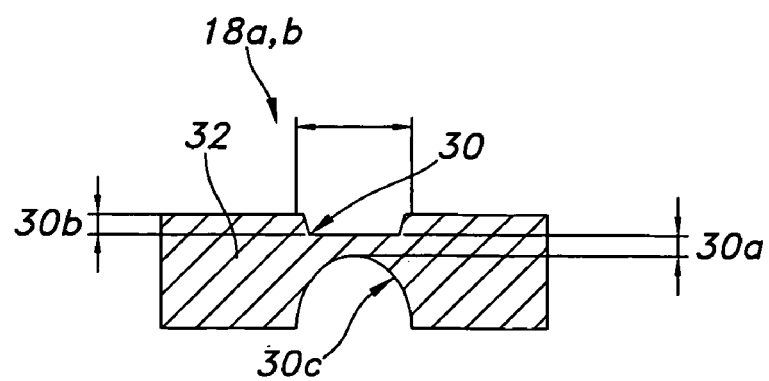
FIG. 7 is a detail view of a living hinge.

Even though the hinges 18 disclosed in these embodiments are continuous along the entire length of the extension element 18c, it will be appreciated that there can be discontinuities between multiple hinge sections on each side of the hinge extension. As illustrated in FIG. 7 and discussed in detail below, the bracket and platform hinges 18a,b are preferably living hinges that are integrally formed with the platform 16 and the brackets 12. Alternatively, one or more sections of the lumbar belt 10 can be connected to the other sections through any type of fastening means. For example, as illustrated in FIG. 5, the platform 16 and bracket 12 sections of the belt lumbar 10 may be fastened to the hinge sections 18 using rivets 24 or any other fastener. For spinal relief, the platform 16 preferably includes a longitudinally-oriented, recessed center channel 26 which is described in U.S. Ser. No. 11/295,425 and which is incorporated herein by reference. The platform 16 can also include lateral ribs 28 that extend beyond the hinge sections 18 toward the brackets 12.

Generally, living hinges 18a,b have a section of material 30 that is thinner 30a than two thicker sections 32 of the part which it connects. The thinner section 30a permits the part's thicker sections 32 to rotate relative to each other. Usually, the materials used to make the living hinge 18a,b are a flexible plastic such as polypropylene and polyethylene which can flex more than a million cycles without failure. It will be appreciated that the thicker sections 32 connected by the living hinge 18a,b are significantly more rigid than the thinner hinge portion 30a. Preferably, the thinner section 30a extends between the thicker sections 32 with a slight recess 30b on one side and a deeper radius 30c on the other side. In addition to these structural guidelines, living hinges 18a,b should be formed so that the molecules are oriented along the hinge line to provide a satisfactory life cycle.

Figure 4:
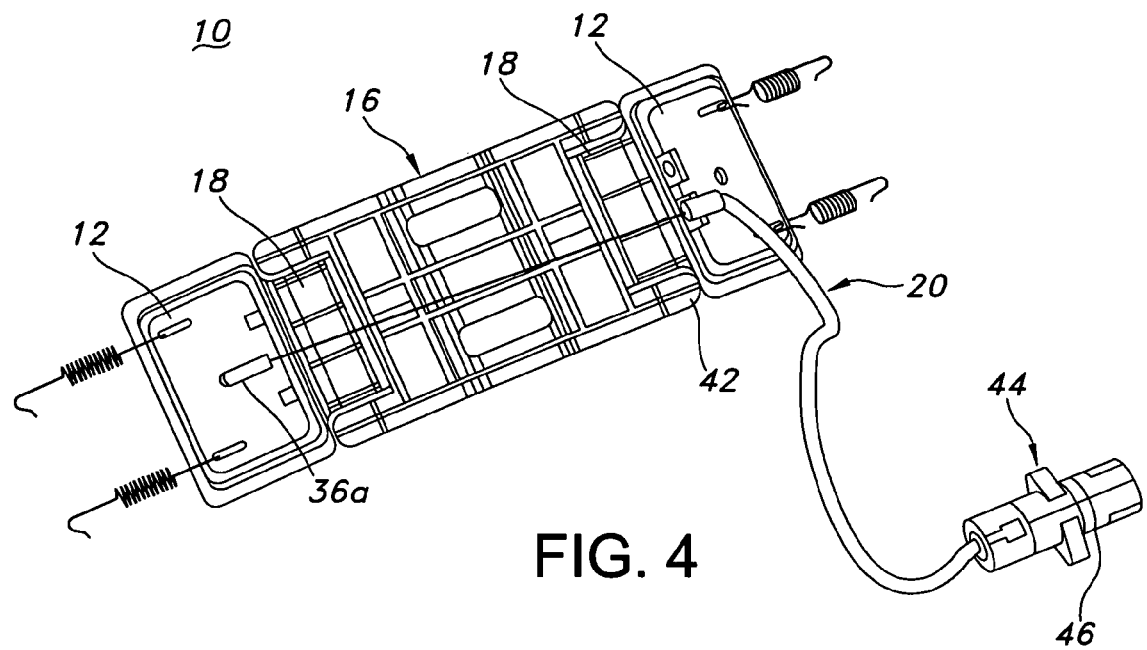
FIG. 4 is an isometric view of the embodiment illustrated in FIG. 1 with a manual actuator.
Figure 8:
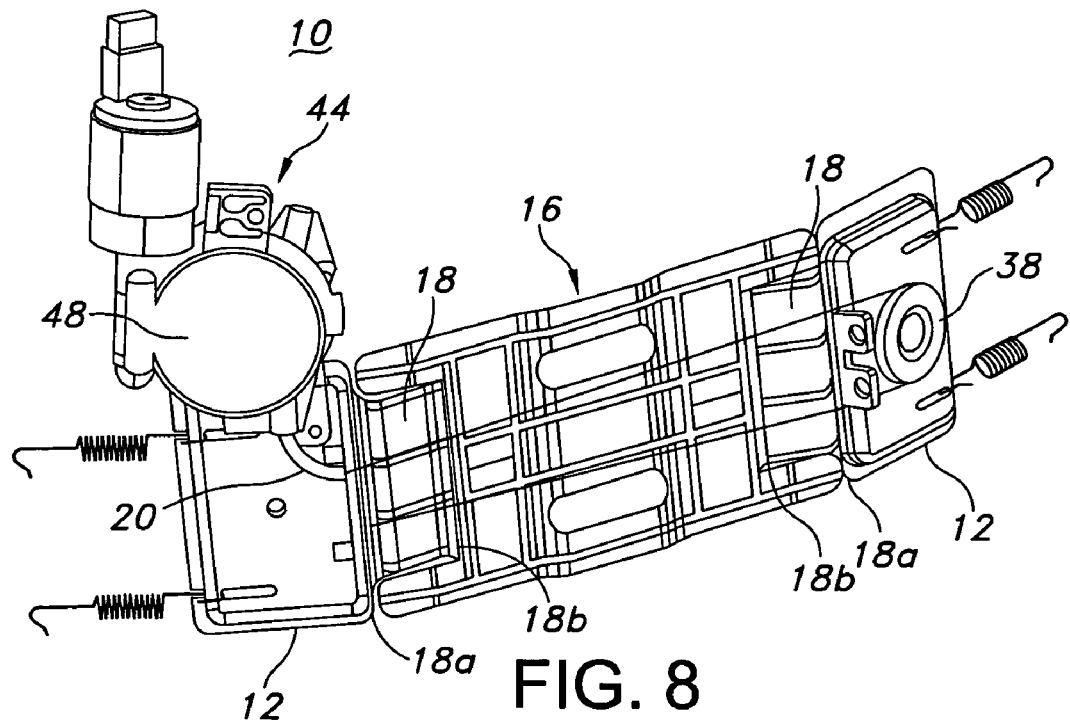
FIG. 8 is an isometric view of another embodiment with a power drive actuator.
Figure 9:
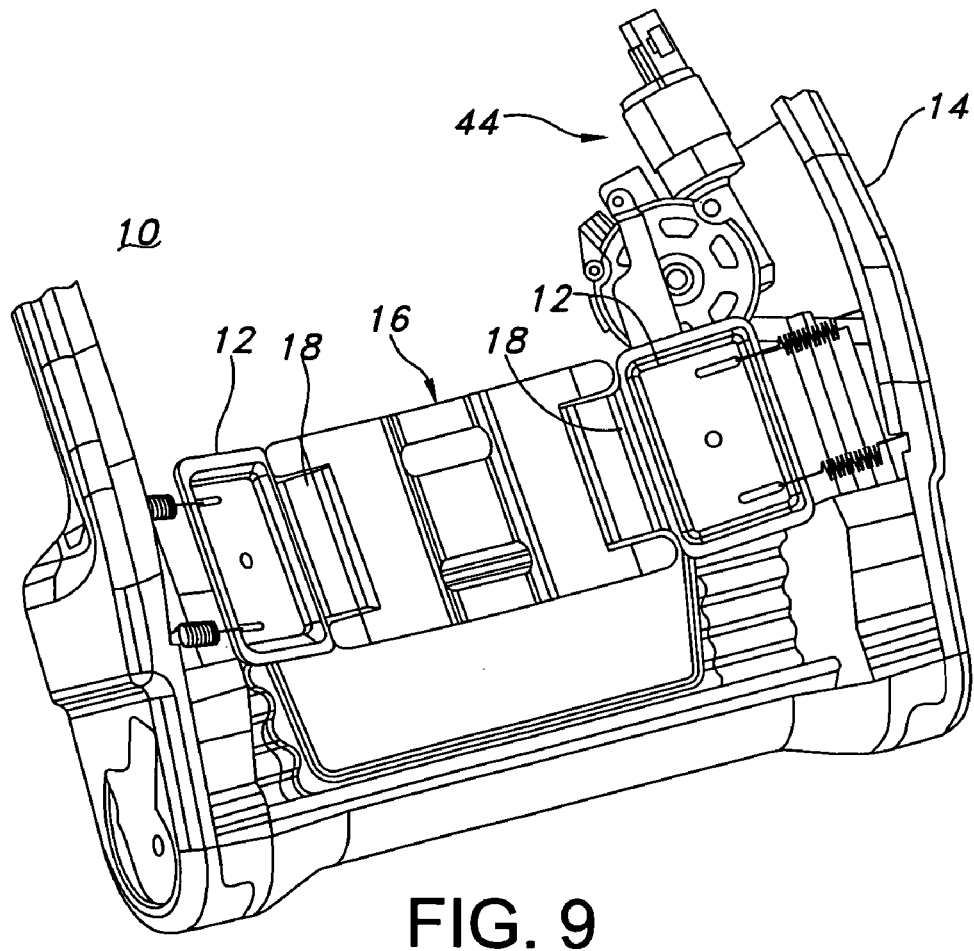
FIG. 9 is an isometric view of the embodiment illustrated in FIG. 8 as installed in a seat frame.

The bowden cable 20 can be connected to the brackets 12 in a variety of different configurations according to the present invention. For example, in the embodiments shown in FIGS. 1-6, the bowden cable's outer sheath 34 and the wire core 36 are directly connected to opposite brackets 12. In the embodiments shown in FIGS. 8-9, a mechanical advantage is added to the system by connecting a pulley 38 to one of the brackets 12 and wrapping the wire core 36 around the pulley 38. Additionally, the outer sheath 34 can be connected to the bracket through a rod 40 or directly into a base 42 formed into the bracket as shown in FIGS. 4 and 5, respectively. The wire core 36 preferably includes a hook 36a (FIGS. 4 & 5), stop (FIG. 8), nodule (FIG. 1) or other attachment element which connects to the other bracket 12. It will also be appreciated that the bowden cable 20 can be operated using different types of actuator assemblies. As shown in FIG. 4, the actuator 44 may be a manual drive 46. Alternatively, as shown in FIG. 8, the actuator may be a powered drive 48.

To force the brackets toward each other, the actuator 44 transmits a tractive force through the bowden cable 20. Although the belt lumbar 10 of the present invention preferably uses the tractive actuator assembly, other types of actuator assemblies, including those supplying pulsive forces may also be used. For example, as one type of pulsive actuator assembly, screw actuators (not shown) could engage threaded rods (not shown) to push the brackets toward each other. Similarly, tractive force may also be applied by a threaded rod which could alternatively pull the brackets toward each other. Accordingly, as discussed in detail above, any means for moving the brackets 12 toward each other will cause the hinged sections 18 to rotate relative to the brackets 12 and will result in the platform 16 being moved forward to its extended position 50 from its retracted position 52.

Figure 6:
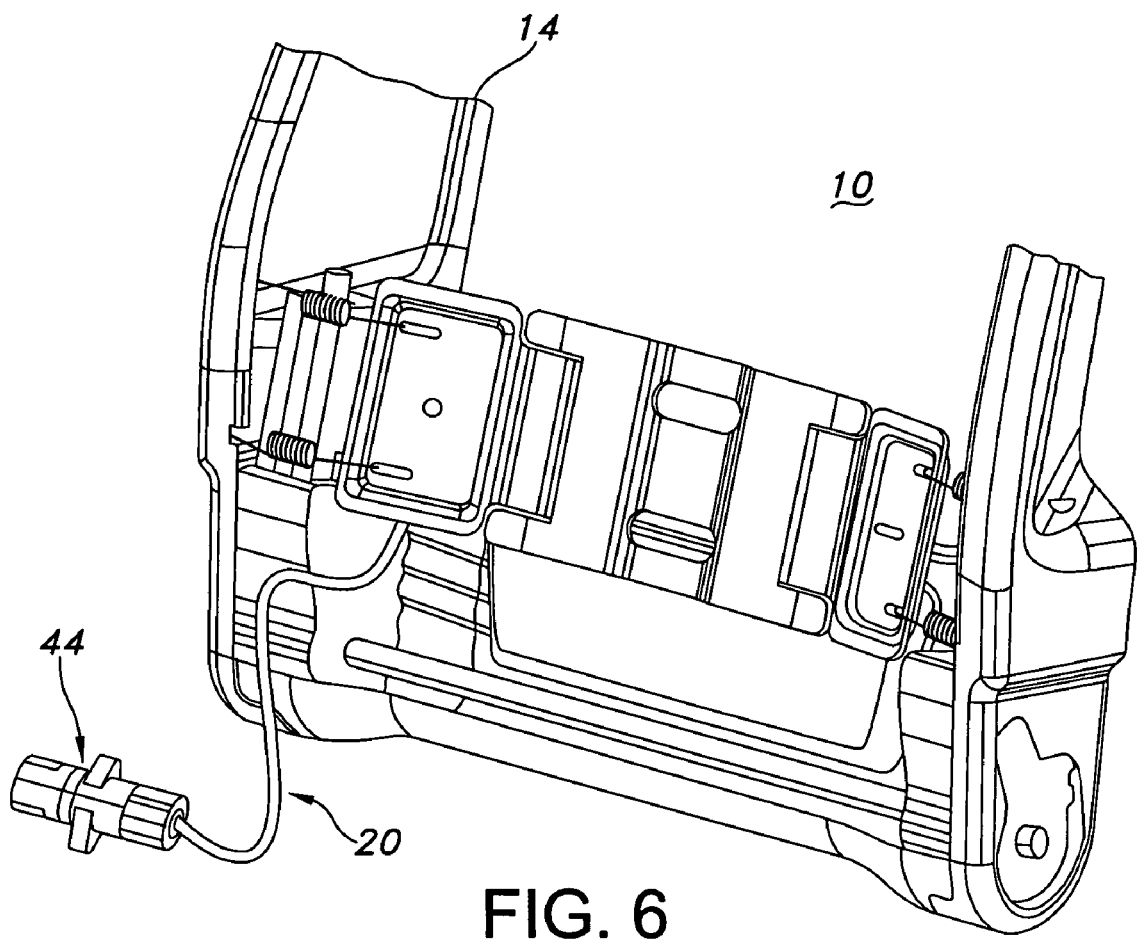
FIG. 6 is an isometric view of the present invention as installed in a seat frame and with a manual drive actuator.

As discussed above and shown in FIG. 5, a single pair of springs 22 can connect the respective brackets 12 to opposite sides of the seat frame 14. When one pair of springs 22 is used, it may be advantageous to add anti-rotation extensions to the brackets as disclosed in U.S. Ser. No. 60/686579 which is hereby incorporated by reference. As illustrated in FIG. 6, a pair of springs 22 can alternatively be used on each side of the frame 14 for connecting the brackets thereto. Accordingly, one set of springs 22 can be longitudinally spaced from another set of springs 22.

According to the present invention's design of the belt lumbar 10, springs 22 are preferably used to connect the brackets 12 to the seat frame 14 because they permit the belt lumbar 10 to be simultaneously actuated with multiple degrees of freedom. In particular, by increasing the tension between the brackets 12, additional tension is placed on the springs 22 and the entire belt lumbar 10, including the brackets 12, is moved forward from its retracted position 52 into its extended position 50 toward the seat occupant. Additionally, since the living hinges 18a,b are more flexible than the brackets 12 and the platform 16, the platform 16 is moved even further toward the seat occupant relative to the outward movement of the bracket. Accordingly, the present invention provides a thin profile in the retracted position 52 when the brackets 12 are moved away from each other and provides more apex travel 54 than would be from tightening a strap lumbar alone. The present invention also maintains the centerline 56 of the belt lumbar 10 equidistant between sides of the seat frame 14 whereas in a number of other strap lumbar designs which only use a single cable pull, the centerline of the strap can shift towards one side of the seat frame 14.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, rather than attaching the belt lumbar directly to the seat frame 14 through the brackets 12 and the springs 22, it will be appreciated that the belt lumbar 10 may be indirectly connected to the seat frame 14 through trim wires in the foam as described in U.S. Ser. No. 11/393,434 which is hereby incorporated by reference herein. Thus, the breadth and scope of the present invention should not be limited by any of the above-described exemplary embodiments, but should be defined only in accordance with the following claims appended hereto and their equivalents.

What is claimed is:

1. A lumbar support for a seat, comprising:
   a platform having a retracted position and an extended position;
   a pair of brackets;
   a pair of hinged sections on opposite sides of said platform respectively connecting said brackets to said platform, wherein each of said hinged sections has a bracket hinge, a platform hinge and an extension element between said bracket hinge and said platform hinge; and
   a means for moving said pair of brackets towards each other, wherein said hinged sections rotate relative to said pair of brackets and said platform moves forward to said extended position from said retracted position.

2. The lumbar support according to claim 1, wherein said moving means is comprised of a bowden cable extending between said pair of brackets, wherein said bowden cable comprises an outer sheath connected to one of said pair of brackets and a wire core connected to another of said pair of brackets, said bowden cable pulling said pair of brackets toward each other and said platform extends away from said pair of brackets, said hinged sections rotating relative to said platform and said pair of brackets.

3. The lumbar support according to claim 2, further comprising a pulley attached to one of said pair of brackets, said wire core wrapping around said pulley.

4. The lumbar support according to claim 1, wherein said platform comprises a longitudinally-oriented, recessed center channel.

5. The lumbar support according to claim 4, wherein said platform further comprises lateral ribs extending beyond said pair of hinged sections toward said brackets.

6. The lumbar support according to claim 1, wherein said pair of hinged sections are comprised of a pair of living hinges integrally formed with said platform and said pair of brackets and have more flexibility than said pair of brackets and said platform.

7. The lumbar support according to claim 1, further comprising a pair of springs respectively connecting said pair of brackets to opposite sides of the seat.

8. The lumbar support according to claim 7, further comprising a seat frame respectively securing said pair of springs at opposite sides of the seat.

9. The lumbar support according to claim 8, wherein said platform comprises a centerline, said centerline remaining substantially equidistant between said seat frame as said pair of brackets move toward each other and said platform extends away from said pair of brackets.

10. The lumbar support according to claim 7, further comprising another pair of springs longitudinally spaced from said pair of springs and also respectively connecting said pair of brackets to opposite sides of the seat.

11. A lumbar support for a seat, comprising:
a belt having opposite ends, said belt comprising a platform, a pair of brackets respectively located at said opposite ends of said belt, and a pair of living hinges respectively connecting said pair of brackets to said platform; and
a means for moving said pair of brackets toward each other, wherein said platform extends away from said pair of brackets as said living hinges rotate relative to said brackets and said platform.

12. The lumbar support according to claim 11, wherein each one of said living hinges comprises a bracket hinge, a platform hinge and an extension element therebetween, and wherein said moving means comprises a bowden cable extending between said pair of brackets, wherein said bowden cable comprises an outer sheath connected to one of said pair of brackets and a wire core connected to another of said pair of brackets, wherein said bowden cable pulls said pair of brackets toward each other.

13. The lumbar support according to claim 11, further comprising a pair of springs respectively attached to said belt opposite ends.

14. The lumbar support according to claim 13, further comprising a seat frame respectively securing said pair of springs to opposite sides of the seat.

15. The lumbar support according to claim 14, wherein said platform comprises a centerline, said centerline remaining substantially equidistant between said seat frame as said bowden cable pulls said pair of brackets toward each other and said platform extends away from said pair of brackets.

16. A lumbar support for a seat, comprising:
a belt having opposite ends, said belt comprising a pair of brackets respectively located at said opposite ends, a platform extending between said pair of brackets and a pair of hinged
a bowden cable extending between said pair of brackets, wherein said bowden cable comprises an outer sheath connected to one of said pair of brackets and a wire core connected to another of said pair of brackets, wherein said bowden cable pulls said pair of brackets toward each other and said platform extends away from said pair of brackets as said hinged sections rotate relative to said platform and said pair of brackets.

17. The lumbar support according to claim 16, further comprising a seat frame respectively securing said pair of springs to opposite sides of the seat.

18. The lumbar support according to claim 16, wherein said belt comprises a centerline, said centerline remaining substantially equidistant between said seat frame as said bowden cable pulls said pair of brackets toward each other and said platform extends away from said pair of brackets.

19. The lumbar support according to claim 16, wherein said pair of hinged sections are comprised of a pair of living hinges integrally formed with said platform and said pair of brackets, each one of said living hinges comprising a bracket hinge, a platform binge and a hinge extension between said bracket hinge and said platform hinge.

20. The lumbar support according to claim 16, further comprising a pulley attached to one of said pair of brackets, said wire core wrapping around said pulley.

* * * * *

UNITED STATES PATENT AND TRADEMARK OFFICE
CERTIFICATE OF CORRECTION

PATENT NO. : 7,328,950 B2  Page 1 of 1
APPLICATION NO. : 11/436276
DATED : February 12, 2008
INVENTOR(S) : Robert J. McMillen and Larry D. Janzen It is certified that error appears in the above-identified patent and that said Letters Patent is hereby corrected as shown below:

| Col./Line No. | Reads | Should Read |
|---|---|---|
| 6/21 | "pair of hinged" | -- pair of hinged sections connecting said platform to said pair of brackets, said pair of hinged sections having more flexibility than said pair of brackets and said platform; a pair of springs respectively attached to said opposite ends of said belt; and -- |

Signed and Sealed this

Second Day of December, 2008

JON W. DUDAS
*Director of the United States Patent and Trademark Office*